(12) United States Patent
Seok et al.

(10) Patent No.: US 12,156,270 B2
(45) Date of Patent: *Nov. 26, 2024

(54) ENHANCED HIGH-THROUGHPUT MULTI-LINK OPERATION MANAGEMENT

(71) Applicant: MediaTek Singapore Pte. Ltd., Singapore (SG)

(72) Inventors: Yongho Seok, San Jose, CA (US); James Chih-Shi Yee, San Jose, CA (US)

(73) Assignee: MediaTek Singapore Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 17/947,152

(22) Filed: Sep. 18, 2022

(65) Prior Publication Data

US 2023/0018719 A1 Jan. 19, 2023

Related U.S. Application Data

(63) Continuation of application No. 16/940,347, filed on Jul. 27, 2020, now Pat. No. 11,483,887.

(60) Provisional application No. 62/895,525, filed on Sep. 4, 2019, provisional application No. 62/880,691, filed on Jul. 31, 2019.

(51) Int. Cl.
*H04W 76/15* (2018.01)
*H04W 76/30* (2018.01)
*H04W 84/12* (2009.01)

(52) U.S. Cl.
CPC ........... *H04W 76/15* (2018.02); *H04W 76/30* (2018.02); *H04W 84/12* (2013.01)

(58) Field of Classification Search
CPC ...... H04W 76/15; H04W 76/30; H04W 84/12
See application file for complete search history.

(56) References Cited

U.S. PATENT DOCUMENTS

| 11,202,286 B2 * | 12/2021 | Huang | H04W 72/27 |
| 2016/0183274 A1 * | 6/2016 | Trainin | H04L 1/00 370/329 |
| 2018/0092039 A1 * | 3/2018 | Cariou | H04W 52/34 |
| 2018/0206284 A1 * | 7/2018 | Zhou | H04L 1/1887 |
| 2018/0262315 A1 * | 9/2018 | Chun | H04L 1/1685 |
| 2018/0332502 A1 * | 11/2018 | Chu | H04L 1/1671 |
| 2019/0335454 A1 * | 10/2019 | Huang | H04W 72/542 |
| 2021/0007168 A1 * | 1/2021 | Asterjadhi | H04W 76/34 |
| 2021/0014776 A1 * | 1/2021 | Patil | H04W 48/16 |
| 2022/0329482 A1 * | 10/2022 | Xiao | H04W 40/244 |

* cited by examiner

*Primary Examiner* — Will W Lin
(74) *Attorney, Agent, or Firm* — Andy M. Han; Han IP PLLC

(57) ABSTRACT

An apparatus (e.g., a station (STA) in a wireless local area network (WLAN)), receives, from an access point (AP), a frame comprising a multi-link configuration information element (IE) that indicates one or more enabled links as a subset of one or more supported links for a traffic identifier (TID). Accordingly, the apparatus transmits, to the AP, data over at least one of the one or more enabled links corresponding to the TID.

18 Claims, 10 Drawing Sheets

900

```
┌─────────────────────────────────────────────┐
│ RECEIVE, BY AN APPARATUS, FROM AN ACCESS POINT│
│ (AP) A FRAME COMPRISING A MULTI-LINK        │
│ CONFIGURATION INFORMATION ELEMENT (IE) THAT │
│ INDICATES ONE OR MORE ENABLED LINKS AS A SUBSET│
│ OF ONE OR MORE SUPPORTED LINKS FOR A TRAFFIC│
│ IDENTIFIER (TID)                            │
│ 910                                         │
└─────────────────────────────────────────────┘
                      │
                      ▼
┌─────────────────────────────────────────────┐
│ TRANSMIT, BY THE APPARATUS, TO THE AP DATA OVER│
│ AT LEAST ONE OF THE ONE OR MORE ENABLED LINKS│
│ CORRESPONDING TO THE TID                    │
│ 920                                         │
└─────────────────────────────────────────────┘
```

```
┌─────────────────────────────────────────────┐
│ RECEIVE, BY AN APPARATUS, FROM AN ACCESS    │
│ POINT (AP) A FRAME COMPRISING A MULTI-LINK  │
│ CONFIGURATION INFORMATION ELEMENT (IE) THAT │
│ INDICATES ONE OR MORE ENABLED LINKS AS A    │
│ SUBSET OF ONE OR MORE SUPPORTED LINKS       │
│                   1010                      │
└─────────────────────────────────────────────┘
                      │
                      ▼
┌─────────────────────────────────────────────┐
│ SELECT, BY THE APPARATUS, AT LEAST ONE      │
│ ENABLED LINK OF THE ONE OR MORE ENABLED     │
│ LINKS                                       │
│                   1020                      │
└─────────────────────────────────────────────┘
                      │
                      ▼
┌─────────────────────────────────────────────┐
│ COMMUNICATE, BY THE APPARATUS, WITH THE AP  │
│ DATA OVER THE AT LEAST ONE ENABLED LINK     │
│                   1030                      │
└─────────────────────────────────────────────┘
```

FIG. 10

ENHANCED HIGH-THROUGHPUT MULTI-LINK OPERATION MANAGEMENT

CROSS REFERENCE TO RELATED PATENT APPLICATIONS

The present disclosure is part of a continuation of U.S. patent application Ser. No. 16/940,347, filed 27 Jul. 2020 and claiming the priority benefit of U.S. Provisional Patent Application Nos. 62/880,691 and 62/895,525, filed on 31 Jul. 2019 and 4 Sep. 2019, respectively. Contents of aforementioned applications are herein incorporated by reference in their entirety.

TECHNICAL FIELD

The present disclosure is generally related to wireless communications and, more particularly, to enhanced high-throughput (EHT) multi-link operation management in wireless local area networks (WLANs).

BACKGROUND

Unless otherwise indicated herein, approaches described in this section are not prior art to the claims listed below and are not admitted as prior art by inclusion in this section.

With respect to EHT multi-link operation in wireless communications, such as wireless communications in a wireless local area network (WLAN) in compliance with the Institute of Electrical and Electronics Engineers (IEEE) 802.11 standard(s), a multi-link station (STA) should transmit frames in multiple links simultaneously in order to improve per-session throughput and reduce latency. Specifically, the multi-link STA performs a channel access in multiple links independently. When the multi-link STA obtains transmit opportunities (TXOPs) in the multiple links, the multi-link STA simultaneously transmits frames on the multiple links (with a link on which the multi-link STA obtains a TXOP being referred to as the primary link). After obtaining the TXOP and in order to avoid in-device coexistence (IDC) interference, an early access of a non-primary link (on which an Enhanced Distributed Channel Access (EDCA) backoff timer is not expired) is allowed if both a physical carrier sense (CS) and a virtual CS of another link are idle. However, as there is not yet a unified multi-link operating mode signaling defined, there is a need for a solution for such signaling to enable effective EHT multi-link operation management.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT multi-link operation management. Under various proposed schemes in accordance with the present disclosure, a unified multi-link operating mode signaling may be utilized for EHT multi-link operation management. For instance, under various proposed schemes, a multi-link STA may use one or more selected links instead of all of its supported multiple links, thereby resulting in reduced energy consumption and reduced cost. Regarding reduced energy consumption, the multi-link STA may operate on one (and no more than one) link of its multiple links. Regarding reduced cost, the multi-link STA may support one (and no more than one) active link (e.g., the multi-link STA needs no more than one encoder/decoder). When a basic service set (BSS) is congested, the multi-link STA may operate on one (and no more than one) link of the multiple links as performance gain with multiple links tends to be quite small.

In one aspect, a method may involve a processor of an apparatus receiving, from an access point (AP), a frame comprising a multi-link configuration information element (IE) that indicates one or more enabled links as a subset of one or more supported links for a traffic identifier (TID). The method may also involve the processor transmitting, to the AP, data over at least one of the one or more enabled links corresponding to the TID.

In another aspect, a method may involve a processor of an apparatus receiving, from an AP, a frame comprising a multi-link configuration IE that indicates one or more enabled links as a subset of one or more supported links. The method may also involve the processor selecting at least one enabled link of the one or more enabled links. The method may further involve the processor communicating with the AP over the at least one enabled link.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 9 is a flowchart of an example process in accordance with an implementation of the present disclosure.

FIG. 10 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT multi-link operation management in wireless communications. According to the present disclosure, a number of possible solutions may be implemented separately or jointly. That is, although these possible solutions may be described below separately, two or more of these possible solutions may be implemented in one combination or another.

Figure 1:
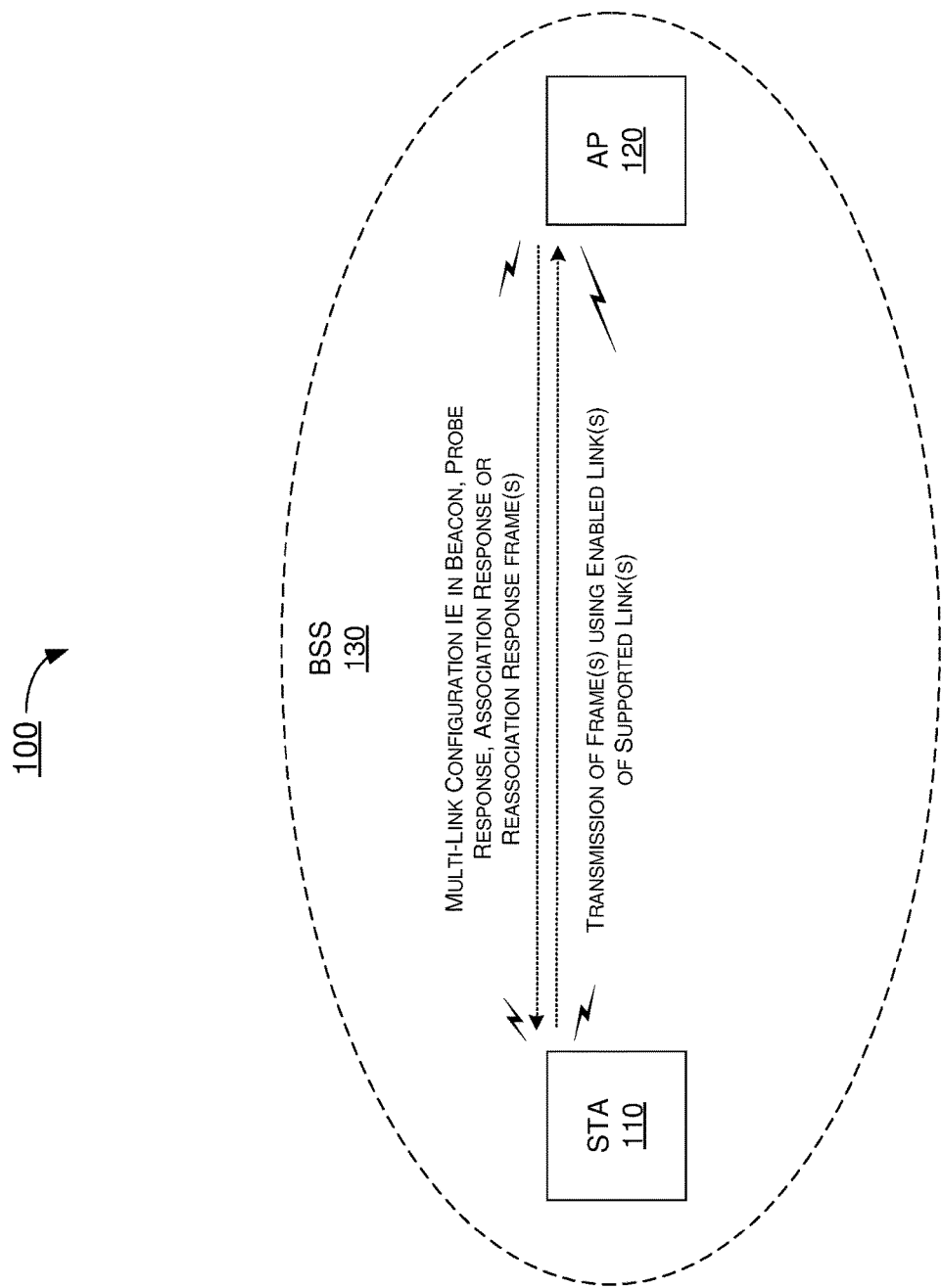
FIG. 1 is a diagram of an example network environment in which various solutions and schemes in accordance with the present disclosure may be implemented.
Figure 2:
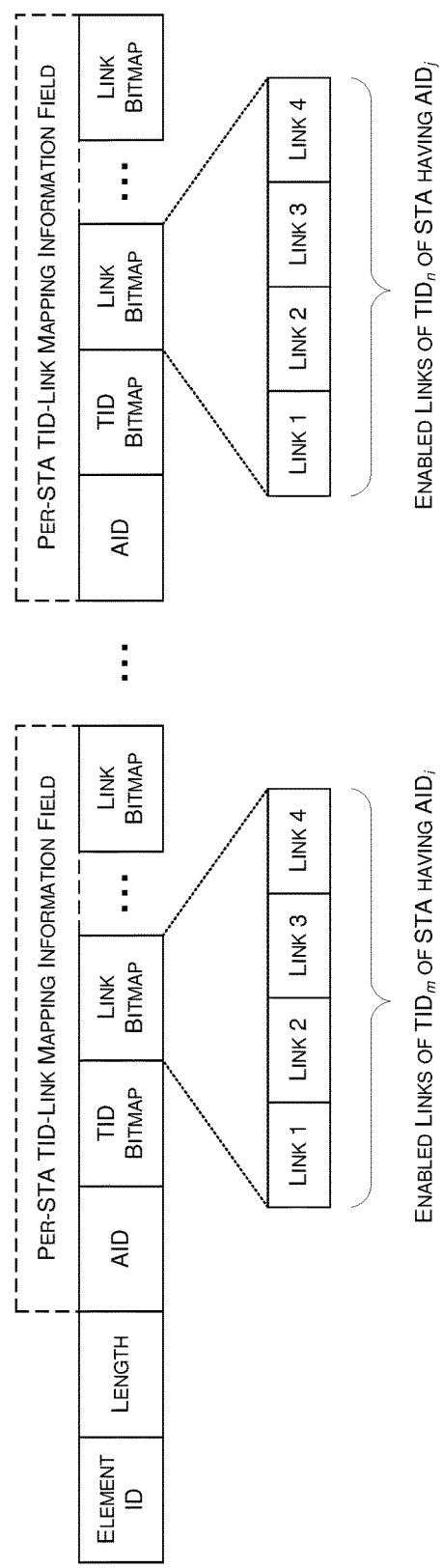
FIG. 2 is a diagram of an example scenario in accordance with the present disclosure.
Figure 3:
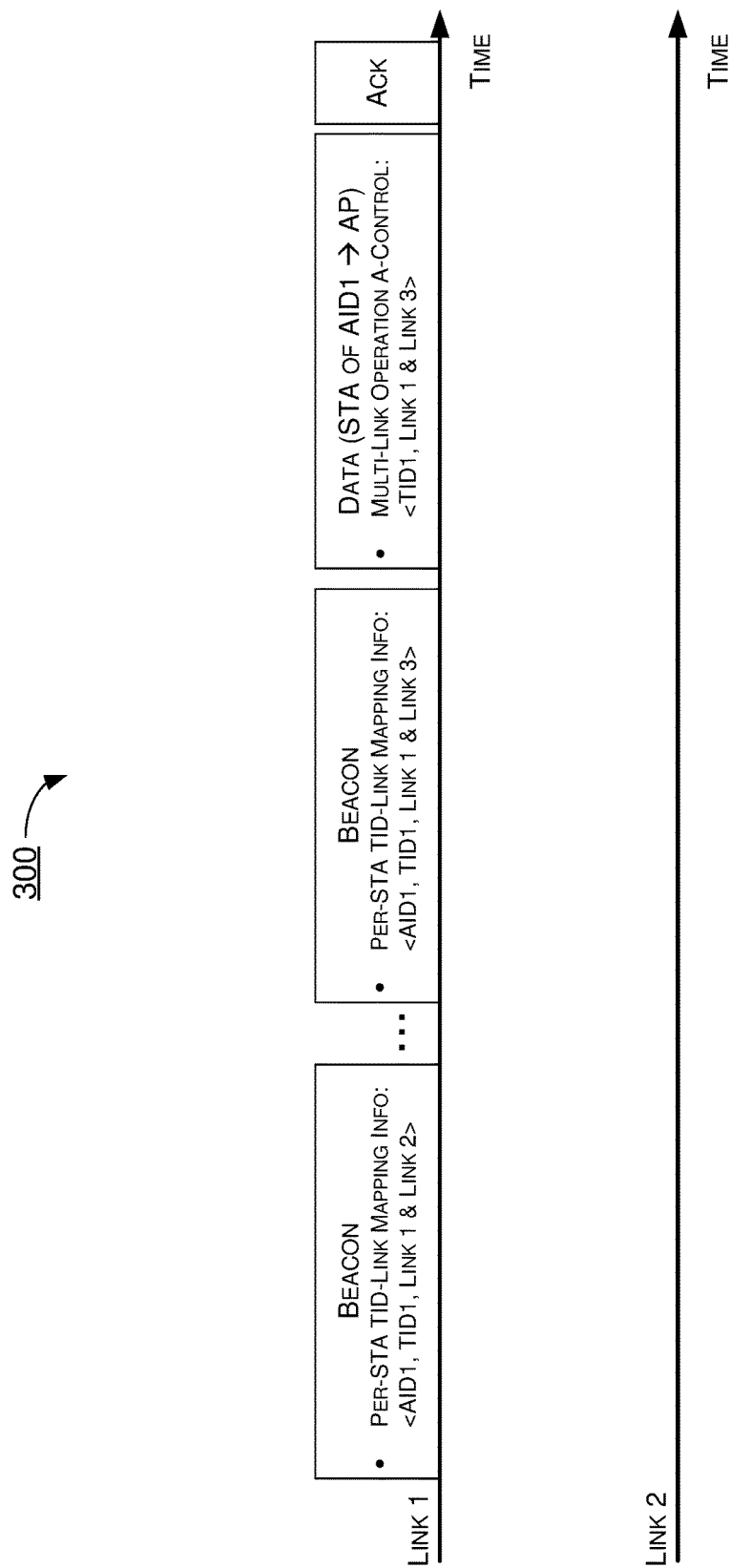
FIG. 3 is a diagram of an example scenario in accordance with the present disclosure.
Figure 4:
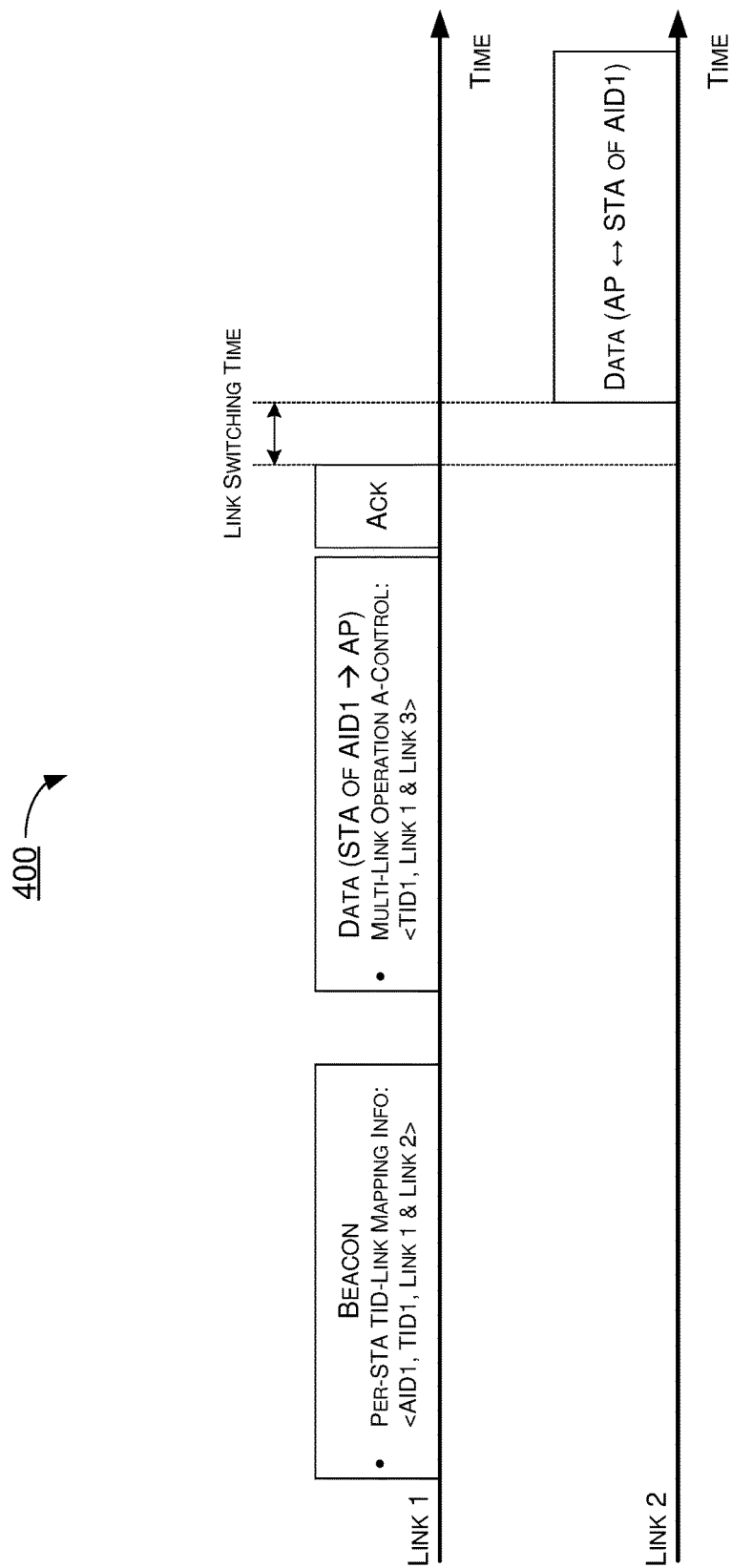
FIG. 4 is a diagram of an example scenario in accordance with the present disclosure.

FIG. 1 illustrates an example network environment 100 in which various solutions and schemes in accordance with the present disclosure may be implemented. FIG. 2~FIG. 4 illustrate examples of implementation of various proposed schemes in network environment 100 in accordance with the present disclosure. The following description of various proposed schemes is provided with reference to FIG. 1~FIG. 4.

Referring to FIG. 1, network environment 100 may involve a STA 110 communicating wirelessly with an AP 120 in a BSS 130 in accordance with one or more IEEE 802.11 standards. STA 110 may be a multi-link STA with one or more links operating in, for example and without limitation, the 2.4 GHz band, 5 GHz-band and/or 6 GHz band. Under various proposed schemes in accordance with the present disclosure, STA 110 and AP 120 may be configured to perform EHT multi-link operation management in wireless communications in accordance with various proposed schemes described below.

Under a proposed scheme in accordance with the present disclosure, AP 120 may include in beacon, probe response, association (or reassociation) response frames a multi-link configuration IE that indicates enabled link(s) of each multi-link STA in communication with AP 120, including STA 110, for each of one or more TIDs. Under the proposed scheme, the per-STA TID-link mapping information field of the multi-link configuration IE may have a number of subfields such as, for example and without limitation, an association identifier (AID) subfield, a TID bitmap subfield, and link bitmap subfields. The AID subfield may indicate the AID of a respective multi-link STA configured by the per-STA TID-link mapping information field. The TID bitmap subfield may indicate one or more TIDs with which one or more link bitmap subfields in the per-STA TID-link mapping information field are associated. For instance, in case a first bit of the TID bitmap subfield is set to "1", a link bitmap subfield for $TID_1$ may be contained in the per-STA TID-link mapping information field. Likewise, in case an eighth bit of the TID bitmap subfield is set to "1", a link bitmap subfield for TIDs may be contained in the per-STA TID-link mapping information field. In case all bits of the TID bitmap subfield are set to "1", eight link bitmap subfields for all TIDs may be contained in the per-STA TID-link mapping information field. In case all bits of the TID bitmap subfield are set to "0", a single link bitmap subfield for all TIDs may be contained in the per-STA TID-link mapping information field.

Each link bitmap subfield may indicate the link on which frames corresponding to the TID associated with the link bitmap subfield are sent. For instance, in case a first bit of the link bitmap subfield for $TID_m$ is set to "1", a first link may be used for sending frames corresponding to $TID_m$. Similarly, in case an eighth bit of the link bitmap subfield for $TID_m$ is set to "1", an eighth link may be used for sending frames corresponding to $TID_m$. Moreover, detailed parameters (e.g., Operating Class and Channel Number) of an $N^{th}$ link may be exchanged at a multi-link operation setup phase. Furthermore, one or more bits in the link bitmap subfield for a single TID may be set to "1".

FIG. 2 illustrates an example scenario 200 in accordance with the present disclosure. In scenario 200, for each multi-link STA, a multi-link configuration IE may include a per-STA TID-link mapping information field, which may include a respective AID subfield, a TID bitmap subfield and one or more link bitmap subfields. Each link bitmap subfield may correspond to a respective link of the respective multi-link STA and may indicate one or more enabled links of the respective TID subfield of the respective multi-link STA. Referring to FIG. 2, a link bitmap subfield for a $TID_m$ of a multi-link STA having $AID_i$ is shown to indicate link 1, link 2, link 3 and link 4. Similarly, a link bitmap subfield for a $TID_n$ of a multi-link STA having $AID_j$ is also shown to indicate link 1, link 2, link 3 and link 4.

Under a proposed scheme in accordance with the present disclosure, in case AP 120 enables more than one links of a plurality of supported links for a single TID for STA 110, STA 110 as a multi-link STA may select and use one or more links (e.g., a subset) of the enabled links for sending frame(s) corresponding to the TID. Moreover, in case AP 120 enables a single link of a plurality of supported links for a single TID for STA 110, STA 110 may use the single enabled link (and not other links) for sending frame(s) corresponding to the TID.

Under a proposed scheme in accordance with the present disclosure, in case STA 110 identifies or otherwise determines that there is a change with respect to its enabled link(s) for one or more TIDs in the received multi-link configuration IE, STA 110 may send to AP 120 a frame having a multi-link operation A-Control field that indicates the new operating link(s) for each of the one or more TIDs which is/are a subset of the changed enabled link(s). FIG. 3 illustrates an example scenario 300 in accordance with the present disclosure. In scenario 300, the enabled links of STA 110 for $TID_1$ are changed from Link 1 and Link 2 to Link 1 and Link 3. Under the proposed scheme, STA 110 may send (e.g., over Link 1) to AP 120 a frame indicating a switch in the operating links from Link 1 and Link 2 to Link 1 and Link 3 in the multi-link operation A-Control field of the frame.

Under a proposed scheme in accordance with the present disclosure, in case current operating link(s) of STA 110 for each of one or more TIDs are not a subset of the enabled link(s) of STA 110 changed by AP 120, STA 110 may send to AP 120 a frame having the multi-link operation A-Control field that indicates the new operating link(s) for each of the one or more TIDs which are a subset of the changed enabled link(s). FIG. 4 illustrates an example scenario 400 in accordance with the present disclosure. In scenario 400, the enabled links of STA 110 are changed from Link 1 to Link 2. Under the proposed scheme, STA 110 may send (e.g., over Link 1) to AP 120 a frame indicating a switch in the operating link from Link 1 to Link 2 in the multi-link operation A-Control field of the frame. After a period of link switching time, AP 120 and STA 110 may exchange frames on Link 2. The link switching time may be signaled or otherwise configured by AP 120 at the multi-link operation setup phase.

It is noteworthy that, in the present disclosure, the term "supported link(s)" refers to one or more communication links on which multi-link aggregation is capable or otherwise supported. Additionally, the term "enabled link(s)" refers to one or more communication links for each of one or more TIDs on which multi-link aggregation is enabled. For instance, AP 120 may determine the enabled link(s) for each TID based on the supported link(s) of STA 110 and the channel utilization of the links, and AP 120 may announce the enabled link(s) for each TID to STA 110. The enabled link(s) may be a subset of the common supported link(s) of both STA 110 and AP 120. Moreover, the term "disabled link(s)" refers to one or more communication links for each of one or more TIDs on which multi-link aggregation is disabled. Furthermore, the term "operating link(s)" refers to one or more communication links for each of one or more TIDs on which multi-link aggregation is operated. For instance, STA 110 may determine the operating link(s) for each TID based on its enabled link(s) for each TID and link quality, and STA 110 may indicate the operating link(s) for each TID to AP 120 (and the operating link(s) may be a subset of the enabled link(s)). Otherwise, the operating link(s) for each TID may be the same links as the enabled link(s) for each TID specified by AP 120.

Figure 5:
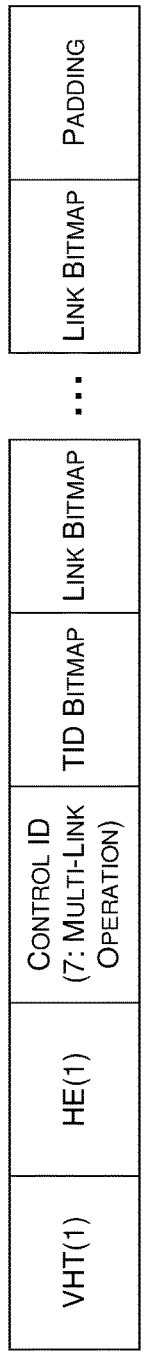
FIG. 5 is a diagram of an example frame in accordance with the present disclosure.

FIG. 5 illustrates an example format 500 in accordance with the present disclosure. Format 500 may be an example of a multi-link operation A-Control field format. Referring to FIG. 5, format 500 may include a TID bitmap subfield and one or more link bitmap subfields. The TID bitmap subfield may indicate TIDs with which the link bitmap subfields in the multi-link operation A-Control field are associated. Each link bitmap subfield may indicate a respective link on which frame(s) corresponding to the TID associated with the link bitmap subfield are sent. Under a proposed scheme in accordance with the present disclosure, a frame having the multi-link operation A-Control field may be defined as a management frame of which the frame body may have the TID bitmap subfield and link bitmap subfield(s).

Under a proposed scheme in accordance with the present disclosure, AP 120 and STA 110 may exchange information on their supported multi-links. For instance, AP 120 may announce an enabled multi-link of STA 110 in the TID-link mapping information field of a multi-link configuration IE to STA 110. The enabled multi-link of STA 110 announced by AP 120 may be one or more links in the supported multi-link of STA 110 but may not be in a disabled multi-link most recently received from STA MLLE 110. Similarly, STA 110 may announce its disabled multi-link to AP 120 through a frame that solicits acknowledgement from AP 120. The disabled multi-link announced by STA 110 may be one or more links in the supported multi-link of STA 110 but may not be all links in the supported multi-link of STA 110.

Under the proposed scheme, each of AP 120 and STA 110 may immediately update the enabled multi-link whenever it transmits or receives either the TID-link mapping information field of a multi-link configuration IE or a frame containing the disabled multi-link. AP 120 and STA 110 may exchange frames using multi-link operation (MLO) on link(s) which is/are in the enabled multi-link but not in the disabled multi-link.

Figure 6:
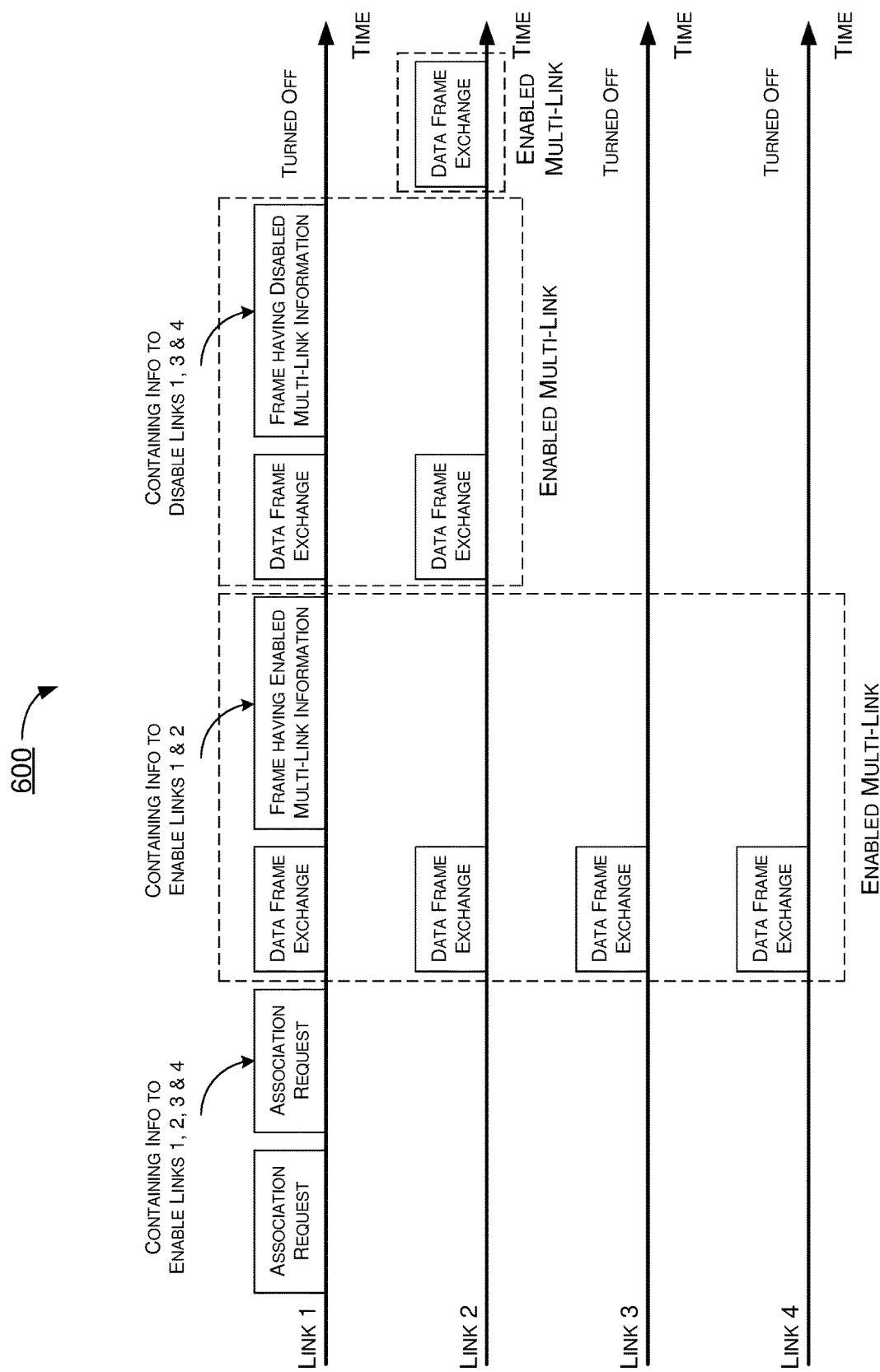
FIG. 6 is a diagram of an example scenario in accordance with the present disclosure.

FIG. 6 illustrates an example scenario 600 of multi-link operating mode exchange in accordance with the present disclosure. In scenario 600, when a multi-link logical entity (MLLE) (which may be an AP such as AP 120 or a STA such as STA 110) supports concurrent link operations, a frame having information of the enabled multi-link may be sent by an AP (e.g., AP 120). Moreover, a frame having information of the disabled multi-link may be sent by a STA (e.g., STA 110).

Figure 7:
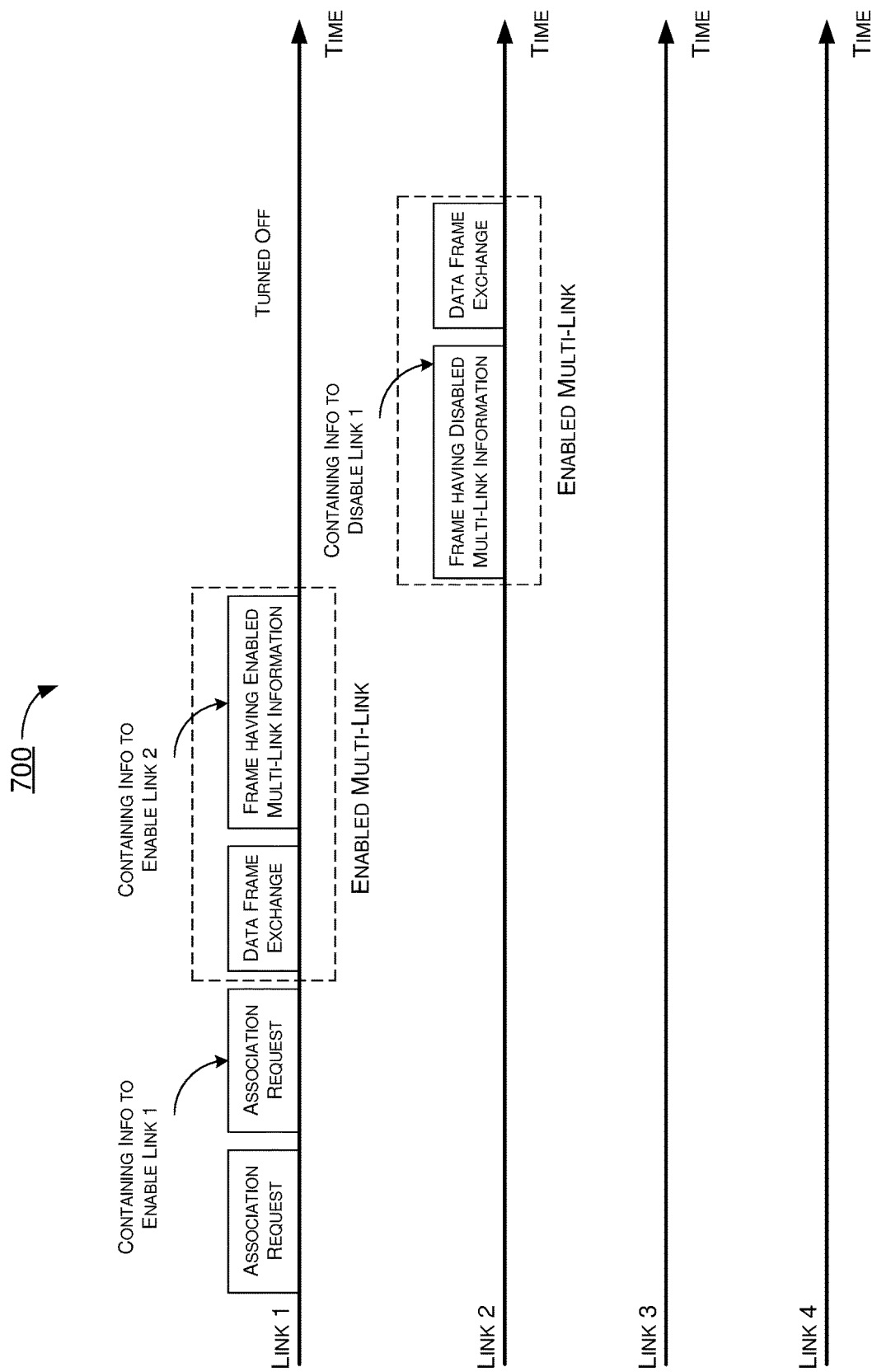
FIG. 7 is a diagram of an example scenario in accordance with the present disclosure.

FIG. 7 illustrates an example scenario 700 of multi-link operating mode exchange in accordance with the present disclosure. In scenario 700, when a MLLE (which may be an AP such as AP 120 or a STA such as STA 110) does not support concurrent link operations, a frame having information of the enabled multi-link may be sent by AP (e.g., AP 120). Moreover, a frame having information of the disabled multi-link may be sent by a STA (e.g., STA 110).

Thus, a signaling mechanism for an enabled multi-link and a disabled multi-link may be implemented according to the proposed schemes described above. Advantageously, a STA (e.g., STA 110) may turn off its radio for the disabled multi-link to result in reduced power consumption and enhanced resource management of other resources to achieve improved load balancing. Moreover, for the power and other resource management of the enabled multi-link, a per-link power management mechanism may be utilized.

In view of the above, under various proposed schemes, a multi-link STA (e.g., STA 110) may use one or more selected links instead of all of its supported multiple links, thereby resulting in reduced energy consumption and reduced cost. Advantageously, the multi-link STA may operate on one (and no more than one) link of its multiple links, thereby achieving reduced energy consumption. Moreover, the multi-link STA may support one (and no more than one) active link at a time, there would be no need for the multi-link STA to be equipped with more than one encoder/decoder, thereby achieving reduced cost.

Illustrative Implementations

Figure 8:
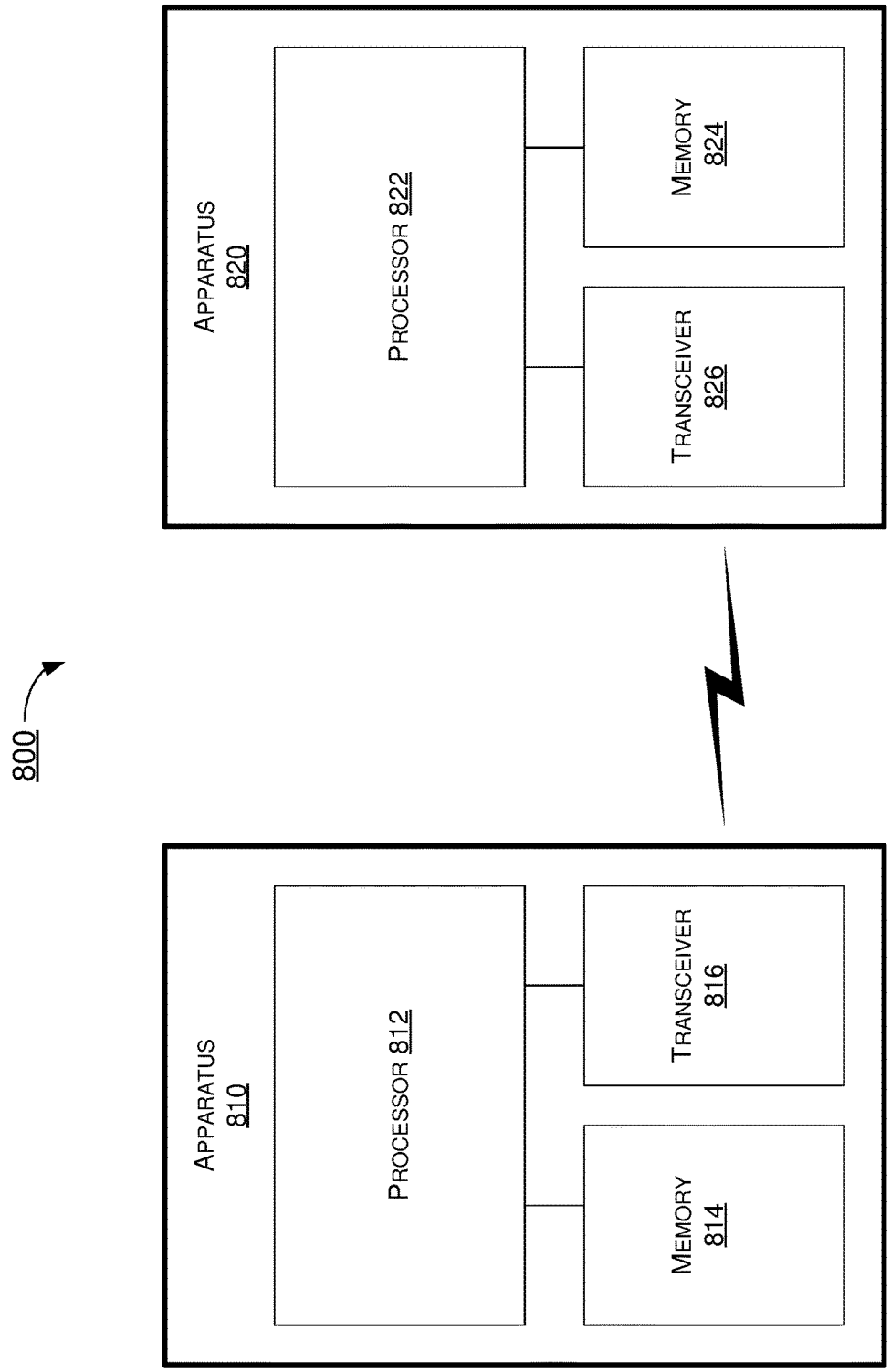
FIG. 8 is a block diagram of an example communication system in accordance with an implementation of the present disclosure.

FIG. 8 illustrates an example system 800 having at least an example apparatus 810 and an example apparatus 820 in accordance with an implementation of the present disclosure. Each of apparatus 810 and apparatus 820 may perform various functions to implement schemes, techniques, processes and methods described herein pertaining to EHT multi-link operation management in wireless communications, including the various schemes described above with respect to various proposed designs, concepts, schemes, systems and methods described above as well as processes described below. For instance, apparatus 810 may be implemented in STA 110 and apparatus 820 may be implemented in AP 120, or vice versa.

Each of apparatus 810 and apparatus 820 may be a part of an electronic apparatus, which may be a STA or an AP, such as a portable or mobile apparatus, a wearable apparatus, a wireless communication apparatus or a computing apparatus. When implemented in a STA, each of apparatus 810 and apparatus 820 may be implemented in a smartphone, a smart watch, a personal digital assistant, a digital camera, or a computing equipment such as a tablet computer, a laptop computer or a notebook computer. Each of apparatus 810 and apparatus 820 may also be a part of a machine type apparatus, which may be an IoT apparatus such as an immobile or a stationary apparatus, a home apparatus, a wire communication apparatus or a computing apparatus. For instance, each of apparatus 810 and apparatus 820 may be implemented in a smart thermostat, a smart fridge, a smart door lock, a wireless speaker or a home control center. When implemented in or as a network apparatus, apparatus 810 and/or apparatus 820 may be implemented in a network node, such as an AP in a WLAN.

In some implementations, each of apparatus 810 and apparatus 820 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 810 and apparatus 820 may be implemented in or as a STA or an AP. Each of apparatus 810 and apparatus 820 may include at least some of those components shown in FIG. 8 such as a processor 812 and a processor 822, respectively, for example. Each of apparatus 810 and apparatus 820 may further include one or more other components not pertinent to the proposed scheme of the present disclosure (e.g., internal power supply, display device and/or user interface device), and, thus, such component(s) of apparatus 810 and apparatus 820 are neither shown in FIG. 8 nor described below in the interest of simplicity and brevity.

In one aspect, each of processor 812 and processor 822 may be implemented in the form of one or more single-core processors, one or more multi-core processors, one or more RISC processors or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including those pertaining to EHT multi-link operation management in wireless communications in accordance with various implementations of the present disclosure.

In some implementations, apparatus 810 may also include a transceiver 816 coupled to processor 812. Transceiver 816 may include a transmitter capable of wirelessly transmitting and a receiver capable of wirelessly receiving data. In some implementations, apparatus 820 may also include a transceiver 826 coupled to processor 822. Transceiver 826 may include a transmitter capable of wirelessly transmitting and a receiver capable of wirelessly receiving data.

In some implementations, apparatus 810 may further include a memory 814 coupled to processor 812 and capable of being accessed by processor 812 and storing data therein. In some implementations, apparatus 820 may further include a memory 824 coupled to processor 822 and capable of being accessed by processor 822 and storing data therein. Each of memory 814 and memory 824 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 814 and memory 824 may include a type of read-only memory (ROM) such as mask ROM, programmable ROM (PROM), erasable programmable ROM (EPROM) and/or electrically erasable programmable ROM (EEPROM). Alternatively, or additionally, each of memory 814 and memory 824 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 810 and apparatus 820 may be a communication entity capable of communicating with each other using various proposed schemes in accordance with the present disclosure. For illustrative purposes and without limitation, a description of capabilities of apparatus 810, as STA 110, and apparatus 820, as AP 120, is provided below. It is noteworthy that, although the example implementations described below are provided in the context of WLAN, the same may be implemented in other types of networks.

Under a proposed scheme in accordance with the present disclosure, with apparatus 810 implemented in or as STA 110 and apparatus 820 implemented in or as AP 120 of a wireless network such as a WLAN in accordance with one or more of IEEE 802.11 standards, apparatus 810 may receive, via transceiver 816, from apparatus 820 a frame including a multi-link configuration IE that indicates one or more enabled links as a subset of one or more supported links for a TID. Additionally, apparatus 810 may transmit, via transceiver 816, to apparatus 820 data over at least one of the one or more enabled links corresponding to the TID.

In some implementations, the frame may include a beacon frame, a probe response frame, an association response frame, or a reassociation response frame.

In some implementations, the multi-link configuration IE may include a respective per-STA TID-link mapping information field for each of one or more TIDs associated with apparatus 810. In some implementations, the per-STA TID-link mapping information field may include a TID bitmap subfield and one or more link bitmap subfields. In such cases, the TID bitmap subfield may indicate the one or more TIDs including the TID, and each of the one or more link bitmap subfields may indicate one or more links including the one or more enabled links corresponding to the TID on which transmission of the data is enabled.

In some implementations, processor 812 may perform additional operations. For instance, processor 812 may determine that there is a change with respect to the one or more enabled links. Furthermore, processor 812 may indicate, via transceiver 816, to apparatus 820 one or more new operating links responsive to the determining.

In some implementations, in determining that there is the change with respect to the one or more enabled links, processor 812 may receive, via transceiver 816, another frame from apparatus 820 indicating the change with respect to the one or more enabled links.

In some implementations, in indicating to apparatus 820 the one or more new operating links, processor 812 may transmit, via transceiver 816, to apparatus 820 a management frame including a multi-link operation A-Control field that indicates the one or more new operating links as a subset of one or more changed enabled links corresponding to the TID. In some implementations, the multi-link operation A-Control field may include a TID bitmap subfield and one or more link bitmap subfields. In such cases, the TID bitmap may indicate one or more TIDs with which the one or more link bitmap subfields in the multi-link operation A-Control field are associated. Moreover, each of the one or more link bitmap subfields may indicate one or more links on which one or more frames corresponding to a respective one of the one or more TIDs associated with the respective link bitmap subfield are transmitted.

In some implementations, processor 812 may perform other operations. For instance, processor 812 may switch an operating link from a first link among the one or more enabled links to a second link among one or more changed enabled links responsive to the determining. Moreover, processor 812 may transmit, via transceiver 816, to apparatus 820 data over the second link.

In some implementations, in indicating to apparatus 820 the one or more new operating links, processor 812 may transmit, via transceiver 816 and over the first link, a management frame including a multi-link operation A-Control field that indicates the one or more new operating links. In such cases, the second link may not be among the one or more enabled links.

In some implementations, in switching the operating link from the first link to the second link, processor 812 may perform the switching using an amount of link switching time. In such cases, the link switching time may be signaled by apparatus 820 at a multi-link operation setup phase.

In some implementations, processor 812 may perform additional operations. For instance, processor 812 may receive, via transceiver 816, from apparatus 820 another frame including another multi-link configuration IE that indicates one or more disabled links among the one or more supported links for the TID. Moreover, processor 812 may turn off the one or more disabled links. Furthermore, processor 812 may transmit, via transceiver 816, to apparatus 820 data over at least one of the one or more enabled links that is not among the one or more disabled links.

Under another proposed scheme in accordance with the present disclosure, with apparatus 810 implemented in or as STA 110 and apparatus 820 implemented in or as AP 120 of a wireless network such as a WLAN in accordance with one or more of IEEE 802.11 standards, apparatus 810 may receive, via transceiver 816, from apparatus 820 a frame including a multi-link configuration IE that indicates one or more enabled links as a subset of one or more supported links. Moreover, apparatus 810 may select at least one enabled link of the one or more enabled links. Furthermore, apparatus 810 may communicate, via transceiver 816, with apparatus 820 over the at least one enabled link.

In some implementations, the frame may include a beacon frame, a probe response frame, an association response frame, or a reassociation response frame.

In some implementations, the multi-link configuration IE may include a respective per-STA TID-link mapping information field for each of one or more TIDs associated with apparatus 810. In some implementations, the per-STA TID-link mapping information field may include a TID bitmap subfield and one or more link bitmap subfields. In such cases, the TID bitmap subfield may indicate the one or more TIDs, and each of the one or more link bitmap subfields may indicate one or more links including the one or more enabled links corresponding to the TID on which transmission of data is enabled.

In some implementations, processor 812 may perform additional operations. For instance, processor 812 may determine that there is a change with respect to the one or more enabled links. Moreover, processor 812 may indicate, via transceiver 816, to apparatus 820 one or more new operating links responsive to the determining.

In some implementations, in indicating to apparatus 820 the one or more new operating links, processor 812 may transmit, via transceiver 816, to apparatus 820 a management frame including a multi-link operation A-Control field that indicates the one or more new operating links as a subset of one or more changed enabled links corresponding to the TID. In some implementations, the multi-link operation A-Control field may include a TID bitmap subfield and one or more link bitmap subfields. In such cases, the TID bitmap may indicate one or more TIDs with which the one or more link bitmap subfields in the multi-link operation A-Control field are associated. Moreover, each of the one or more link bitmap subfields may indicate one or more links on which one or more frames corresponding to a respective one of the one or more TIDs associated with the respective link bitmap subfield are transmitted.

In some implementations, processor 812 may perform other operations. For instance, processor 812 may receive, via transceiver 816, from apparatus 820 another frame including another multi-link configuration IE that indicates one or more disabled links among the one or more supported links for the TID. Moreover, processor 812 may turn off the one or more disabled links. Furthermore, processor 812 may transmit, via transceiver 816, to apparatus 820 data over at least one of the one or more enabled links that is not among the one or more disabled links.

Illustrative Processes

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to EHT multi-link operation management in wireless communications in accordance with the present disclosure. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in apparatus 810 and apparatus 820 as well as any variations thereof. Solely for illustrative purposes and without limiting the scope, process 900 is described below in the context of apparatus 810 implemented in or as STA 110 and apparatus 820 implemented in or as AP 120 of a wireless network such as a WLAN in accordance with one or more of IEEE 802.11 standards. Process 900 may begin at block 910.

At 910, process 900 may involve apparatus 810 receiving, via transceiver 816, from apparatus 820 a frame including a multi-link configuration IE that indicates one or more enabled links as a subset of one or more supported links for a TID. Process 900 may proceed from 910 to 920.

At 920, process 900 may involve apparatus 810 transmitting, via transceiver 816, to apparatus 820 data over at least one of the one or more enabled links corresponding to the TID.

In some implementations, the frame may include a beacon frame, a probe response frame, an association response frame, or a reassociation response frame.

In some implementations, the multi-link configuration IE may include a respective per-STA TID-link mapping information field for each of one or more TIDs associated with apparatus 810. In some implementations, the per-STA TID-link mapping information field may include a TID bitmap subfield and one or more link bitmap subfields. In such cases, the TID bitmap subfield may indicate the one or more TIDs including the TID, and each of the one or more link bitmap subfields may indicate one or more links including the one or more enabled links corresponding to the TID on which transmission of the data is enabled.

In some implementations, process 900 may further involve processor 812 performing additional operations. For instance, process 900 may involve processor 812 determining that there is a change with respect to the one or more enabled links. Furthermore, process 900 may involve processor 812 indicating, via transceiver 816, to apparatus 820 one or more new operating links responsive to the determining.

In some implementations, in determining that there is the change with respect to the one or more enabled links, process 900 may involve processor 812 receiving, via transceiver 816, another frame from apparatus 820 indicating the change with respect to the one or more enabled links.

In some implementations, in indicating to apparatus 820 the one or more new operating links, process 900 may involve processor 812 transmitting, via transceiver 816, to apparatus 820 a management frame including a multi-link operation A-Control field that indicates the one or more new operating links as a subset of one or more changed enabled links corresponding to the TID. In some implementations, the multi-link operation A-Control field may include a TID bitmap subfield and one or more link bitmap subfields. In such cases, the TID bitmap may indicate one or more TIDs with which the one or more link bitmap subfields in the multi-link operation A-Control field are associated. Moreover, each of the one or more link bitmap subfields may indicate one or more links on which one or more frames corresponding to a respective one of the one or more TIDs associated with the respective link bitmap subfield are transmitted.

In some implementations, process 900 may further involve processor 812 performing other operations. For instance, process 900 may involve processor 812 switching an operating link from a first link among the one or more enabled links to a second link among one or more changed enabled links responsive to the determining. Moreover, process 900 may involve processor 812 transmitting, via transceiver 816, to apparatus 820 data over the second link.

In some implementations, in indicating to apparatus 820 the one or more new operating links, process 900 may involve processor 812 transmitting, via transceiver 816 and over the first link, a management frame including a multi-link operation A-Control field that indicates the one or more new operating links. In such cases, the second link may not be among the one or more enabled links.

In some implementations, in switching the operating link from the first link to the second link, process 900 may involve processor 812 performing the switching using an amount of link switching time. In such cases, the link switching time may be signaled by apparatus 820 at a multi-link operation setup phase.

In some implementations, process 900 may further involve processor 812 performing additional operations. For instance, process 900 may involve processor 812 receiving, via transceiver 816, from apparatus 820 another frame including another multi-link configuration IE that indicates one or more disabled links among the one or more supported links for the TID. Moreover, process 900 may involve processor 812 turning off the one or more disabled links. Furthermore, process 900 may involve processor 812 transmitting, via transceiver 816, to apparatus 820 data over at least one of the one or more enabled links that is not among the one or more disabled links.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to EHT multi-link operation management in wireless communications in accordance with the present disclosure. Process 1000 may include one or more operations, actions, or functions as illustrated by one or more of blocks 1010, 1020 and 1030. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 810 and apparatus 820 as well as any variations thereof. Solely for illustrative purposes and without limiting the scope, process 1000 is described below in the context of apparatus 810 implemented in or as STA 110 and apparatus 820 implemented in or as AP 120 of a wireless network such as a WLAN in accordance with one or more of IEEE 802.11 standards. Process 1000 may begin at block 1010.

At 1010, process 1000 may involve apparatus 810 receiving, via transceiver 816, from apparatus 820 a frame including a multi-link configuration IE that indicates one or more enabled links as a subset of one or more supported links. Process 1000 may proceed from 1010 to 1020.

At 1020, process 1000 may involve apparatus 810 selecting at least one enabled link of the one or more enabled links. Process 1000 may proceed from 1020 to 1030.

At 1030, process 1000 may involve apparatus 810 communicating, via transceiver 816, with apparatus 820 over the at least one enabled link.

In some implementations, the frame may include a beacon frame, a probe response frame, an association response frame, or a reassociation response frame.

In some implementations, the multi-link configuration IE may include a respective per-STA TID-link mapping information field for each of one or more TIDs associated with apparatus 810. In some implementations, the per-STA TID-link mapping information field may include a TID bitmap subfield and one or more link bitmap subfields. In such cases, the TID bitmap subfield may indicate the one or more TIDs, and each of the one or more link bitmap subfields may indicate one or more links including the one or more enabled links corresponding to the TID on which transmission of data is enabled.

In some implementations, process 1000 may further involve processor 812 performing additional operations. For instance, process 1000 may involve processor 812 determining that there is a change with respect to the one or more enabled links. Moreover, process 1000 may involve processor 812 indicating, via transceiver 816, to apparatus 820 one or more new operating links responsive to the determining.

In some implementations, in indicating to apparatus 820 the one or more new operating links, process 1000 may involve processor 812 transmitting, via transceiver 816, to apparatus 820 a management frame including a multi-link operation A-Control field that indicates the one or more new operating links as a subset of one or more changed enabled links corresponding to the TID. In some implementations, the multi-link operation A-Control field may include a TID bitmap subfield and one or more link bitmap subfields. In such cases, the TID bitmap may indicate one or more TIDs with which the one or more link bitmap subfields in the multi-link operation A-Control field are associated. Moreover, each of the one or more link bitmap subfields may indicate one or more links on which one or more frames corresponding to a respective one of the one or more TIDs associated with the respective link bitmap subfield are transmitted.

In some implementations, process 1000 may further involve processor 812 performing other operations. For instance, process 1000 may involve processor 812 receiving, via transceiver 816, from apparatus 820 another frame including another multi-link configuration IE that indicates one or more disabled links among the one or more supported links for the TID. Moreover, process 1000 may involve processor 812 turning off the one or more disabled links. Furthermore, process 1000 may involve processor 812 transmitting, via transceiver 816, to apparatus 820 data over at least one of the one or more enabled links that is not among the one or more disabled links.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by an apparatus, from an access point (AP) a frame comprising a multi-link configuration information element (IE) that indicates one or more enabled links as a subset of one or more supported links; and transmitting, by the apparatus, to the AP data over at least one of the one or more enabled links,
wherein the frame comprises an association response frame or a reassociation response frame.

2. The method of claim 1, wherein the multi-link configuration IE comprises a traffic identifier (TID)-link mapping information field for each of one or more TIDs associated with the apparatus.

3. The method of claim 2, wherein the TID-link mapping information field comprises a TID bitmap subfield and one or more link bitmap subfields, and wherein:
the TID bitmap subfield indicates the one or more TIDs including the TID, and
each of the one or more link bitmap subfields indicates one or more links comprising the one or more enabled links corresponding to the TID on which transmission of the data is enabled.

4. The method of claim 1, further comprising:
determining, by a processor of the apparatus, that there is a change with respect to the one or more enabled links; and
indicating, by the processor, to the AP one or more new operating links responsive to the determining.

5. The method of claim 4, wherein the determining that there is the change with respect to the one or more enabled links comprises receiving another frame from the AP indicating the change with respect to the one or more enabled links.

6. The method of claim 4, wherein the indicating to the AP the one or more new operating links comprises transmitting to the AP a management frame comprising a multi-link operation A-Control field that indicates the one or more new operating links as a subset of one or more changed enabled links.

7. The method of claim 6, wherein the multi-link operation A-Control field comprises a traffic identifier (TID) bitmap subfield and one or more link bitmap subfields, and wherein:
the TID bitmap indicates one or more TIDs with which the one or more link bitmap subfields in the multi-link operation A-Control field are associated, and
each of the one or more link bitmap subfields indicates one or more links on which one or more frames corresponding to a respective one of the one or more TIDs associated with the respective link bitmap subfield are transmitted.

8. The method of claim 4, further comprising:
switching, by the processor, an operating link from a first link among the one or more enabled links to a second link among one or more changed enabled links responsive to the determining; and
transmitting, by the processor, to the AP data over the second link.

9. The method of claim 8, wherein the indicating to the AP the one or more new operating links comprises transmitting, over the first link, a management frame comprising a multi-link operation A-Control field that indicates the one or more new operating links, and wherein the second link is not among the one or more enabled links.

10. The method of claim 8, wherein the switching the operating link from the first link to the second link comprises performing the switching using an amount of link switching time, and wherein the link switching time is signaled by the AP at a multi-link operation setup phase.

11. The method of claim 1, further comprising:
receiving, by a processor of the apparatus, from the AP another frame comprising another multi-link configuration IE that indicates one or more disabled links among the one or more supported links.

12. The method of claim 11, further comprising:
transmitting, by the processor, to the AP data over at least one of the one or more enabled links that is not among the one or more disabled links.

13. A method, comprising:
receiving, by an apparatus, from an access point (AP) a frame comprising a multi-link configuration information element (IE) that indicates one or more enabled links as a subset of one or more supported links;
receiving, by the apparatus, from the AP another frame comprising another multi-link configuration IE that indicates one or more disabled links among the one or more supported links; and
transmitting, by the apparatus, to the AP data over at least one of the one or more enabled links that is not among the one or more disabled links.

14. The method of claim 13, wherein the frame comprises a beacon frame, a probe response frame, an association response frame, or a reassociation response frame.

15. The method of claim 13, wherein the multi-link configuration IE comprises a traffic identifier (TID)-link mapping information field for each of one or more TIDs associated with the apparatus.

16. The method of claim 15, wherein the TID-link mapping information field comprises a TID bitmap subfield and one or more link bitmap subfields, and wherein:
the TID bitmap subfield indicates the one or more TIDs, and
each of the one or more link bitmap subfields indicates one or more links comprising the one or more enabled links corresponding to the TID on which transmission of data is enabled.

17. The method of claim 13, further comprising:
determining, by a processor of the apparatus, that there is a change with respect to the one or more enabled links; and
indicating, by the processor, to the AP one or more new operating links responsive to the determining.

18. The method of claim 17, wherein the indicating to the AP the one or more new operating links comprises transmitting to the AP a management frame comprising a multi-link operation A-Control field that indicates the one or more new operating links as a subset of one or more changed enabled links corresponding to the TID, wherein the multi-link operation A-Control field comprises a TID bitmap subfield and one or more link bitmap subfields, and wherein:
the TID bitmap indicates one or more TIDs with which the one or more link bitmap subfields in the multi-link operation A-Control field are associated, and
each of the one or more link bitmap subfields indicates one or more links on which one or more frames corresponding to a respective one of the one or more TIDs associated with the respective link bitmap subfield are transmitted.

* * * * *